United States Patent
Tamaya et al.

(10) Patent No.: US 8,265,111 B2
(45) Date of Patent: Sep. 11, 2012

(54) LASER LIGHT SOURCE MODULE

(75) Inventors: Motoaki Tamaya, Tokyo (JP); Chise Nanba, Tokyo (JP); Akira Nakamura, Tokyo (JP); Keiichi Fukuda, Tokyo (JP); Koji Funaoka, Tokyo (JP); Manabu Kawakami, Tokyo (JP); Masamitsu Okamura, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 11 days.

(21) Appl. No.: 12/921,822

(22) PCT Filed: Mar. 18, 2008

(86) PCT No.: PCT/JP2008/054959
§ 371 (c)(1),
(2), (4) Date: Sep. 10, 2010

(87) PCT Pub. No.: WO2009/116134
PCT Pub. Date: Sep. 24, 2009

(65) Prior Publication Data
US 2011/0026548 A1 Feb. 3, 2011

(51) Int. Cl.
*H01S 3/04* (2006.01)
(52) U.S. Cl. .......... 372/36; 372/34; 372/21; 372/22
(58) Field of Classification Search .......... 372/21, 372/22, 34, 36
See application file for complete search history.

(56) References Cited

U.S. PATENT DOCUMENTS

| 4,847,851 | A | | 7/1989 | Dixon |
| 5,848,092 | A | | 12/1998 | Mitsumoto et al. |
| 5,867,513 | A | | 2/1999 | Sato |
| 5,872,803 | A | | 2/1999 | Mori et al. |
| 6,101,201 | A | | 8/2000 | Hargis et al. |
| 6,130,902 | A | * | 10/2000 | Shimoji .................. 372/34 |
| 6,240,113 | B1 | | 5/2001 | Peterson |

(Continued)

FOREIGN PATENT DOCUMENTS

JP 05-090698 4/1993
(Continued)

OTHER PUBLICATIONS

International Search Report dated Jun. 24, 2008, issued in the corresponding International Application No. PCT/JP2008/054959, and an English Translation thereof.

(Continued)

*Primary Examiner* — Tod T Van Roy
(74) *Attorney, Agent, or Firm* — Buchanan Ingersoll & Rooney PC

(57) ABSTRACT

When a laser light source module includes a heat sink in which a solid laser element, an excitation light source, and a wavelength conversion element are arranged and a stem that supports the heat sink, wherein the heat sink is separated into three blocks, namely a first block including a laser oscillating unit for the solid laser element is arranged, a second block including a semiconductor laser element that emits excitation light for the laser oscillating unit and a first temperature sensor are arranged and on a specific surface of which the first heater is arranged, and a third block including the wavelength conversion element that converts the wavelength of the fundamental laser beam and a second temperature sensor are arranged and on a specific surface of which a second heater is arranged, enabling thus downsizing of the module and improvement of the positioning accuracy of the elements.

5 Claims, 6 Drawing Sheets

U.S. PATENT DOCUMENTS

| | | | |
|---|---|---|---|
| 2004/0182929 | A1 | 9/2004 | Aoshima et al. |
| 2005/0063441 | A1 | 3/2005 | Brown |
| 2007/0121689 | A1* | 5/2007 | Brown .......................... 372/39 |
| 2007/0230519 | A1 | 10/2007 | Heo et al. |

FOREIGN PATENT DOCUMENTS

| | | |
|---|---|---|
| JP | 06-152014 | 5/1994 |
| JP | 07-043759 | 2/1995 |
| JP | 09-293917 | 11/1997 |
| JP | 10-079551 | 3/1998 |
| JP | 2000-228556 | 8/2000 |
| JP | 2001-085767 | 3/2001 |
| WO | WO 2005/030980 | 4/2005 |

OTHER PUBLICATIONS

Canadian Office Action issued by the Canadian Patent Office on Feb. 29, 2012 in corresponding Canadian Application No. 2,718,903.

Extended European Search Report dated Feb. 21, 2012 issued in the European Patent Office in corresponding European Application No. 08722353.3 (5 pages).

Jürgen W. Czarske et al., "Birefringent Nd:YAG microchip laser used in heterodyne vibrometry", Optical Communications 114 (1995), pp. 223-229.

* cited by examiner

LASER LIGHT SOURCE MODULE

TECHNICAL FIELD

The present invention relates to a laser light source module including a solid laser that oscillates a fundamental laser beam and a wavelength conversion element that converts the wavelength of the fundamental laser beam oscillated by the solid laser.

BACKGROUND ART

Recently, a non-linear optical (NLO) wavelength conversion element that uses quasi-phase-matching in NLO crystal having a periodically poled structure has realized wavelength conversion with high efficiency. For example, a laser light source module that oscillates a visible laser beam can be obtained, in which the NLO wavelength conversion element converts the wavelength of ultra-red laser oscillated by a solid laser element to generate the second harmonic. Here, for the excitation light source of the solid laser element, a semiconductor laser element may be adopted.

The above NLO wavelength conversion element performs wavelength conversion with high efficiency when the phase-matching conditions are satisfied. For example, at the time of the second harmonic generation, high conversion efficiency can be achieved when the phase velocity of a non-linearly poled wave that is forcibly excited by the incident fundamental laser beam matches the phase velocity of the second harmonic generated by the non-linear polarization, bringing the light waves generated at the different positions of the element to the same phase so that coherent addition can be performed thereon. However, the NLO wavelength conversion element is temperature-dependent and changes its wavelength dispersion characteristics in accordance with the operating temperature. The operating temperature of the NLO wavelength conversion element therefore must be stabilized to prevent the phase-matching conditions from becoming unsatisfied.

The output light intensity and oscillation wavelength of the semiconductor laser element are also temperature-dependent. Under an environment of a temperature higher than the optimal operating temperature, the oscillation wavelength of the semiconductor laser element becomes longer. When a semiconductor laser is used as an excitation light source of a solid laser element that adopts a laser medium having a steep absorption spectrum such as yttrium vanadate ($YVO_4$), a change in the oscillation wavelength of the semiconductor laser element is responsible for reduction of the output of the solid laser element.

Thus, the semiconductor laser element and the NLO wavelength conversion element should be maintained at certain temperatures to increase the optical output of a laser light source module incorporating a semiconductor laser element, a solid laser, and an NLO wavelength conversion element. The optical output of the laser light source module can be increased, of course, by exciting the solid laser element by use of a semiconductor laser array in which multiple semiconductor laser oscillators are arranged in a single element. With such a structure also, the entire semiconductor laser array should be maintained uniformly at a certain temperature, and the entire NLO wavelength conversion element should be maintained uniformly at a certain temperature from the aspect of increasing the optical output of the laser light source module.

For example, in a harmonic generator described in Patent Document 1, two Peltier devices are arranged on a substrate, with a semiconductor laser element on one Peltier device and an NLO wavelength conversion element fixed by a holding member onto the other Peltier device, so that the temperatures of the semiconductor laser element and the NLO wavelength conversion element can be controlled separately by these Peltier devices. The temperature of the semiconductor laser element is controlled in accordance with the temperature measured by a thermistor arranged in the semiconductor laser element, while the temperature of the NLO wavelength conversion element is controlled in accordance with a temperature measured by a thermistor arranged in the holding member to which the NLO wavelength conversion element is fixed.

Furthermore, Patent Document 2 describes a semiconductor laser device in which cooling means such as a Peltier device and a fin are arranged outside the casing of the module, and two heat transfer means are arranged inside the casing with a semiconductor laser element arranged on one heat transfer means by way of a heater, and a semiconductor electroabsorption optical modulator arranged on the other heat transfer means by way of a heater. In such a semiconductor laser device, the temperature of the semiconductor laser element is controlled in accordance with the temperature detected by a temperature sensor directly attached to the semiconductor laser element, while the temperature of the semiconductor electroabsorption optical modulator is controlled in accordance with the temperature detected by a temperature sensor directly attached to the electroabsorption optical modulator.

[Patent Document 1] Japanese Patent Application Laid-open No. H7-43759
[Patent Document 2] Japanese Patent Application Laid-open No. 2000-228556

DISCLOSURE OF INVENTION

Problem to be Solved by the Invention

The harmonic generator described in Patent Document 1 and the semiconductor laser device described in Patent Document 2, however, in which a cooling means is provided inside, are difficult to be downsized. In addition, because the semiconductor laser element and the wavelength conversion element are arranged on a single substrate or in a single component, accuracy of positioning these elements is difficult to improve, especially in the thickness direction of the substrate or the component.

For example, when a laser light source module is formed by using a semiconductor laser element that oscillates excitation light, a solid laser element that oscillates a fundamental laser beam, and a wavelength conversion element that converts the wavelength of the fundamental laser beam, the optical output of the laser light source module is lowered if the positioning accuracy of these elements is insufficient. Especially to improve the optical output in a laser light source module of a type adopting a waveguide-type laser oscillating unit of a solid laser element and a waveguide-type NLO wavelength conversion element or for a laser light source module of a type adopting a semiconductor laser array for the excitation light source, the positioning accuracy should be increased so that connection losses of the excitation light and the fundamental laser beam can be reduced.

The present invention has been conceived in light of the above, and the purpose is to achieve a laser light source module comprising a semiconductor laser element, a solid laser element, and a wavelength conversion element, which can be downsized and easily attain high positioning accuracy for these elements.

Means for Solving Problem

In order to achieve the afore-mentioned object, a laser light source module according to one aspect of the present invention is constructed in such a manner as to include a heat sink in which a solid laser element that oscillates a fundamental laser beam, an excitation light source that excites the solid laser element, and a wavelength conversion element that converts a wavelength of the fundamental laser beam oscillated by the solid laser element, and a stem that supports the heat sink, wherein the heat sink is separated into three blocks that are: a first block on a top surface of which a laser oscillating unit for the solid laser element that oscillates the fundamental laser beam is arranged; a second block on a top surface of which a semiconductor laser element that emits excitation light for the laser oscillating unit and a first temperature sensor are arranged, and on a specific surface of which a first heater is arranged; and a third block on a top surface of which the wavelength conversion element that converts the wavelength of the fundamental laser beam oscillated by the laser oscillating unit and a second temperature sensor are arranged, and on a specific surface of which a second heater is arranged; and only the second block is fixed at a side surface or a bottom surface thereof to the stem, the first block is fixed to the other side surface of the second block, and the third block is fixed to a side surface of the first block.

Effect of the Invention

In a laser light source module according to the present invention, among a first block in which a laser oscillating unit of a solid laser element is arranged, a second block in which a semiconductor laser element is arranged, and a third block in which a wavelength conversion element is arranged, only the second block is fixed to the stem, and thus it is easy to adjust, with respect to the second block, the relative positions of the other blocks. For this reason, a module having the solid laser element, the semiconductor laser element, and the wavelength conversion element arranged with high positioning accuracy can be readily attained.

In addition, the second block and the third block include a first heater or a second heater, and each of the first to third blocks forms a heat sink. Thus, without a cooling element in the module, the temperatures of the semiconductor laser element, the laser oscillating unit, and the wavelength conversion element can be controlled by a cooling device arranged outside the module and the first and second heaters. Hence, the present invention can readily achieve a laser light source module including a semiconductor laser element, a solid laser element, and a wavelength conversion element, which is downsized and has high positioning accuracy for each element.

EXPLANATIONS OF LETTERS OR NUMERALS

Figure 1:
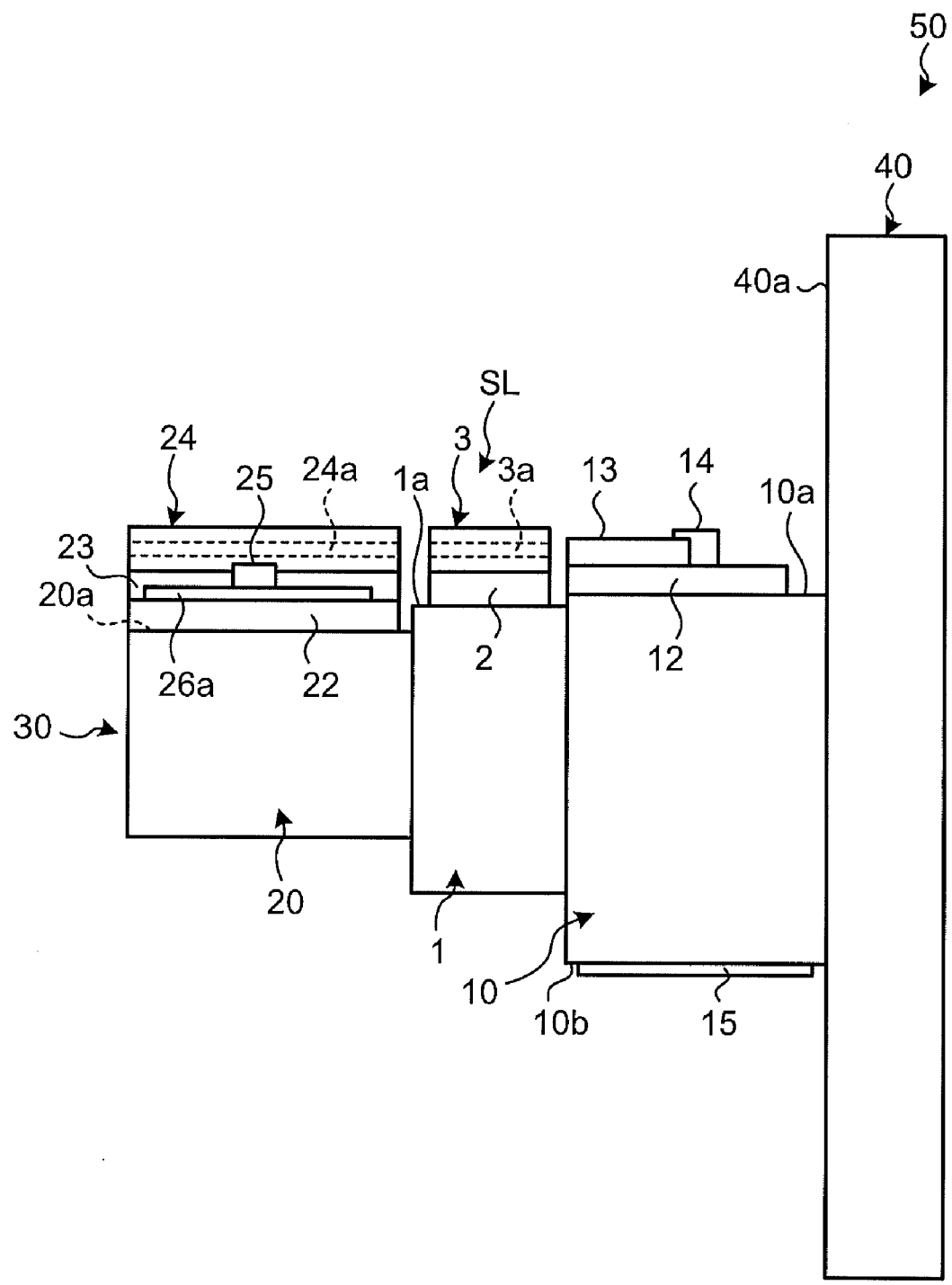
FIG. 1 is a schematic side view of an example laser light source module according to the present invention.

1 First block
1a Top surface of first block
3 Laser oscillating unit
10 Second block
10a Top surface of second block
10b Bottom surface of the second block
12 Sub-mount
13 Excitation light source (semiconductor laser element)
14 First temperature sensor
15 First heater
20, 120 Third block
20a, 120a Top surface of third block
120b Bottom surface of third block
22, 122 Substrate
23 Thermal diffusion plate
24 Wavelength conversion element
24a Optical waveguide (wavelength converting unit)
25 Second temperature sensor
26a, 26b, 126 Second heaters
30, 130 Heat sink
40 Stem
50, 150 Laser light source module
60 Cooling device (Peltier element)
SL Solid laser element
LB Laser beam

BEST MODE(S) FOR CARRYING OUT THE INVENTION

Exemplary embodiments of the laser light source module according to the present invention are explained in detail below with reference to the drawings. The present invention should not be limited to the following embodiments, however.

First Embodiment

Figure 2:
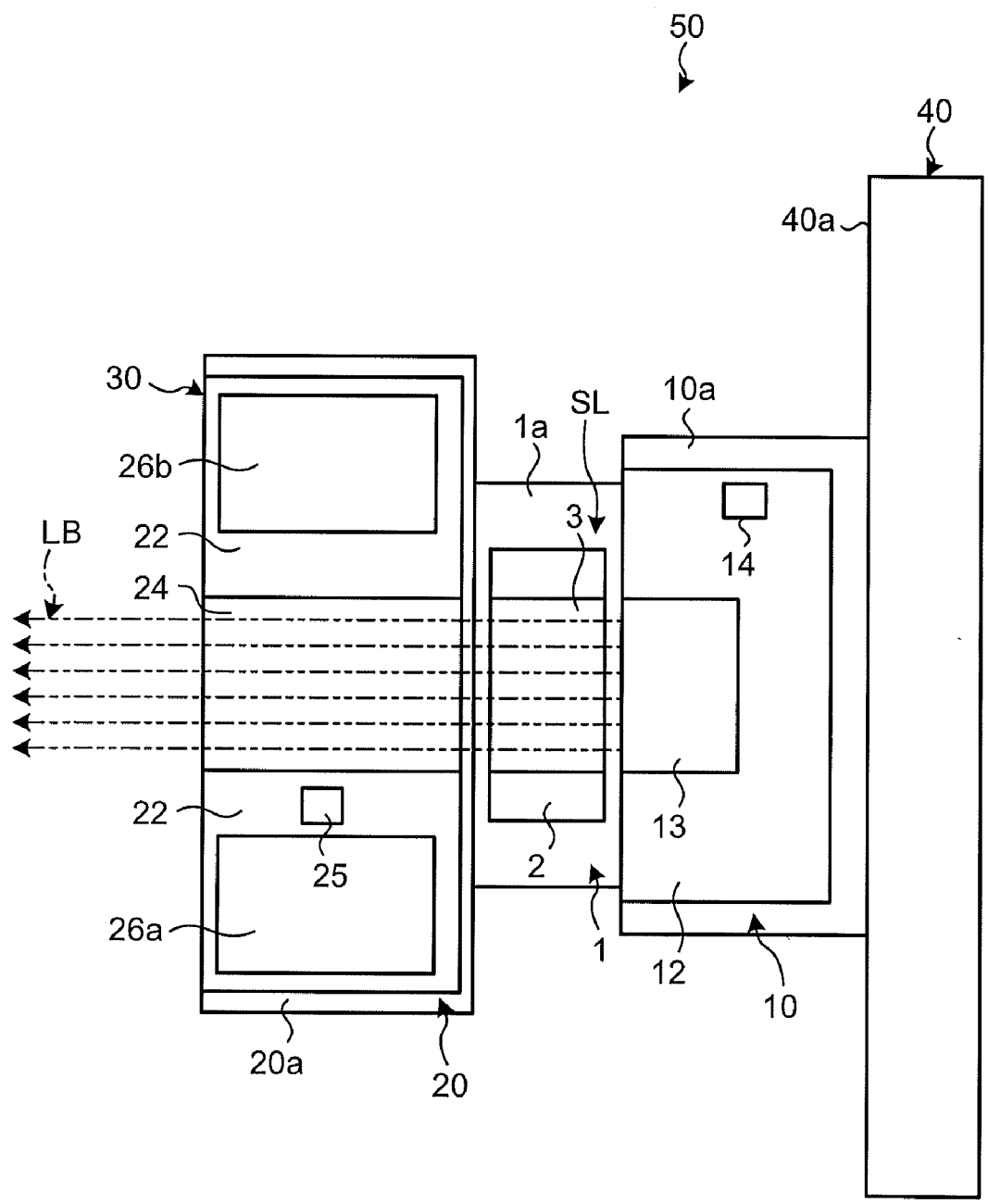
FIG. 2 is a schematic plan view of the laser light source module illustrated in FIG. 1.

FIG. 1 is a schematic side view of an example of the laser light source module according to the present invention, and FIG. 2 is a schematic plan view of the laser light source module of FIG. 1. A laser light source module 50 illustrated in these drawings includes a heat sink 30 that is separated into three blocks, i.e., a first block 1, a second block 10, and a third block 20, and a stem 40 that supports the heat sink 30.

A sub-mount 2 is fixed onto a top surface 1a of the first block 1 with a joint material (not shown), and a laser oscillating unit 3 is fixed onto the sub-mount 2 with a joint material (not shown). As the above joint materials, any material such as solder, a conductive adhesive, and a nonconductive adhesive, can be suitably adopted (in a like manner hereinafter). The first block 1 is a plate member having two side surfaces orthogonal to the optical axis of the laser oscillating unit 3, and is prepared with a metal material or an alloy material that has a high thermal conductivity, including copper and copper-base materials such as copper tungsten.

The sub-mount 2 fixed onto the first block 1 forms a certain pattern of thermal distribution in the laser oscillating unit 3 and generates a lens effect from the thermal distribution to suppress optical diffusion in the laser oscillating unit 3. For this reason, as the sub-mount 2, a comb-shaped type that has multiple joint surfaces on the side of the laser oscillating unit 3 is adopted.

The laser oscillating unit 3 may be of a waveguide type used for a solid laser element, having multiple optical waveguides that oscillate fundamental laser beams. In FIG. 1, one optical waveguide 3a is illustrated. If the laser light source module 50 oscillates a green laser beam, optical waveguides are formed of a laser medium such as neodymium-doped yttrium vanadate ($Nd:YVO_3$). The laser oscillating unit 3 forms a solid laser element SL together with a laser resonator that is described later.

A sub-mount 12 is fixed onto a top surface 10a of the second block 10 with a joint material (not shown), and a semiconductor laser element 13 and a first temperature sensor 14 are arranged and fixed onto the sub-mount 12 with a joint material (not shown). In addition, a first heater 15 (see FIG. 1) is arranged and fixed onto a bottom surface 10b of the second block 10 with a joint material (not shown). In the same manner as the first block 1, the second block 10 is a plate member prepared with a metal material or an alloy material having a high thermal conductivity, and has two side surfaces orthogonal to the optical axis of the semiconductor laser element 13.

The sub-mount 12 that is fixed to the second block 10 is formed of an electric insulating material, mitigates thermal stress caused between the second block 10 and the semiconductor laser element 13 by a difference between the linear expansion coefficients of the second block 10 and the semiconductor laser element 13 during the operation of the semiconductor laser element 13. A drive circuit pattern (not shown) connected to the semiconductor laser element 13 and the first temperature sensor 14 is formed on the sub-mount 12.

The semiconductor laser element 13 is a semiconductor laser array including multiple semiconductor laser oscillators, is connected to a not-shown external circuit, and functions as a excitation light source that emits a excitation light beam for the solid laser element SL. If the optical waveguides of the laser oscillating unit 3 is formed of $Nd:YVO_3$, semiconductor laser oscillators, for example, that oscillate near-infrared laser beams in a 800-nanometer waveband are adopted. As the first temperature sensor 14, a thermistor may be adopted. The first temperature sensor 14 detects a temperature in the vicinity of the semiconductor laser element 13, and the first heater 15 heats the semiconductor laser element 13 by way of the second block 10 and the sub-mount 12. The semiconductor laser element 13, the first temperature sensor 14, and the first heater 15 are connected to external circuits at the time of implementing the laser light source module 50.

A substrate 22 is fixed to the top surface 20a of the third block 20 with a joint material (not shown), a heat equalizing plate 23 is fixed onto the substrate 22 with a joint material (not shown), and a wavelength conversion element 24 is fixed onto the heat equalizing plate 23 with a joint material (not shown). In addition, a second temperature sensor 25 and two second heaters 26a and 26b (see FIG. 2 for the second heater 26b) are arranged and fixed onto the substrate 22 with a joint material (not shown). In the same manner as the first block 1, the third block 20 is a flat plate member prepared with a metal material or an alloy material of a high thermal conductivity and having two side surfaces orthogonal to the optical axis of the wavelength conversion element 24.

The substrate 22 fixed to the third block 20 is a flat plate member prepared with an electronic insulating material having a relatively high thermal conductivity such as glass and ceramic, and a drive circuit pattern of the second temperature sensor 25 and drive circuit patterns of the second heaters 26a and 26b are formed on the substrate 22. The heat equalizing plate 23 is formed of a metal material or an alloy material having an excellent heat conductivity such as copper and aluminum so that the temperature distribution of the wavelength conversion element 24 becomes uniform.

The wavelength conversion element 24 is, for example, of a waveguide type having multiple optical waveguides formed of a non-linear optical crystal (e.g. potassium niobate ($KNbO_3$) and lithium niobate ($LiNbO_3$)) that has a periodically poled structure, and the optical waveguides function as a wavelength converting unit. In FIG. 1, one optical waveguide 24a is illustrated. Because the wavelength conversion efficiency of the wavelength conversion element 24 is temperature-dependent, the wavelength conversion element 24 is maintained at a certain temperature during the operation of the laser light source module 50. The second temperature sensor 25 detects the temperature in the vicinity of the wavelength conversion element 24, and the second heaters 26a and 26b heat the wavelength conversion element 24 by way of the substrate 22 and the heat equalizing plate 23. A thermistor may be used as the second temperature sensor 25, and the second heaters 26a and 26b may be prepared by coating an electric resistance paste and firing it. Each of the second temperature sensor 25 and the second heaters 26a and 26b are connected to external circuits at the time of implementation of the laser light source module 50.

The stem 40 supports the first to third blocks 1, 10, and 20 that are described above. In the laser light source module 50, only the second block 10 is fixed to the main surface 40a of the stem 40 with a joint material (not shown), while the first block 1 and the third block 20 are fixed to the second block 10 and the first block 1, respectively.

More specifically, the blocks 1, 10, and 20 have their top surfaces 1a, 10a, and 20a orientated to the same direction and fixed in such a manner that the excitation light emitted from the semiconductor laser element 13 is incident upon the optical waveguide of the laser oscillating unit 3 and the fundamental laser beam oscillated by the laser oscillating unit 3 is incident upon the optical waveguide of the wavelength conversion element 24. One of the two side surfaces of the second block 10 orthogonal to the optical axis of the semiconductor laser element 13 is adhered to the main surface 40a of the stem 40 with a joint material (not shown), and the other side surface is adhered to one of the two side surface of the first block 1 orthogonal to the optical axis of the laser oscillating unit 3 with a joint material (not shown). Furthermore, the other side surface of the two side surfaces of the first block 1 orthogonal to the optical axis of the laser oscillating unit 3 is fixed to one of the two side surfaces of the third block 20 orthogonal to the optical axis of the wavelength conversion element 24 with a joint material (not shown). A gap of tens of micrometers is provided between the semiconductor laser element 13 and the laser oscillating unit 3, and a gap of tens of micrometers is provided also between the laser oscillating unit 3 and the wavelength conversion element 24.

The optical axis of the laser oscillating unit 3 represents the optical axis of each optical waveguide 3a arranged in the laser oscillating unit 3, and the optical axis of the wavelength conversion element 24 represents the optical axis of each optical waveguide 24a arranged in the wavelength conversion element 24. The light emission end of the semiconductor laser element 13 is provided on the side of the laser oscillating unit 3, and the light emission end of the laser oscillating unit 3 is provided on the side of the wavelength conversion element 24.

The laser light source module 50 having such a structure is provided with optical thin films (not shown) that serve as resonator mirrors at the optical incident ends of the optical waveguides 3a of the laser oscillating unit 3 and at the optical incident ends of the optical waveguides 24a of the wavelength conversion element 24, and these optical thin films form a laser resonator. This laser resonator and the optical waveguides of the laser oscillating unit 3 form the solid laser element SL. When the laser oscillators of the semiconductor laser element 13 oscillate excitation light beams, these excitation light beams are incident on the optical waveguides 3a of the laser oscillating unit 3, and fundamental laser beams are thereby oscillated by the optical waveguides 3a. These fundamental laser beams are repeatedly reflected and amplified in the laser resonator. Part of the fundamental laser beams are incident on a certain optical waveguide 24a of the wavelength conversion element 24, where the wavelength is converted, for example, into a second harmonic, which is emitted from the wavelength conversion element 24. In FIG. 2, chain double-dashed lines are drawn to show laser beams LB oscillated by the laser light source module 50.

When the laser light source module 50 is used, the semiconductor laser element 13, the first heater 15, and the second heaters 26a and 26b are of course connected to the external circuits. When thermistors are adopted for the first temperature sensor 14 and the second temperature sensor 25, the first temperature sensor 14 and the second temperature sensor 25 are also connected to the external circuits. For this reason, the stem 40 is provided with a certain number of lead pins, and the lead pins are connected to the drive circuit pattern formed on the sub-mount 12, the first heater 15, the drive circuit pattern formed on the substrate 22, and the second heaters 26a and 26b. Then, cooling devices such as a Peltier element, a heat pipe, and a fan are arranged outside the stem 40.

Figure 3:
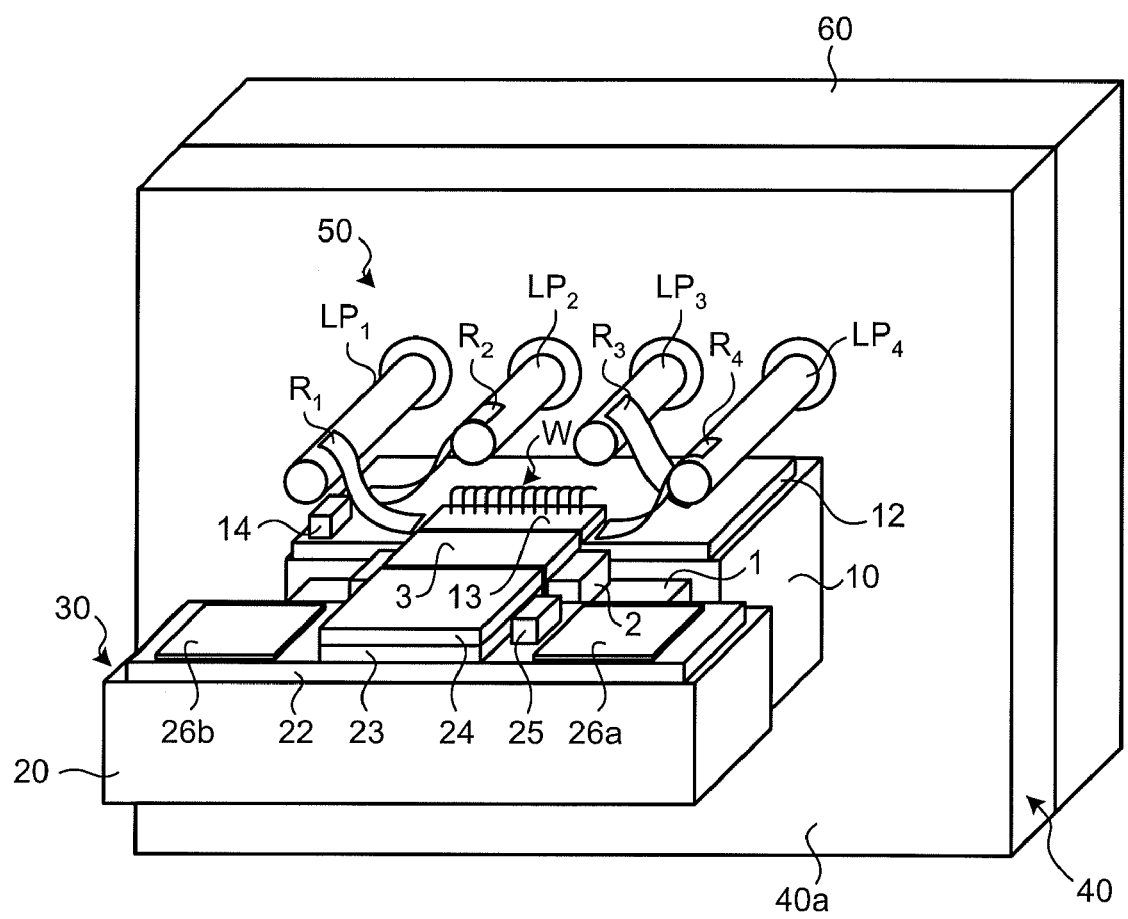
FIG. 3 is a schematic perspective view of a usage example of the laser light source module illustrated in FIGS. 1 and 2.

FIG. 3 is a schematic perspective view of an example usage pattern of the laser light source module illustrated in FIGS. 1 and 2. In the illustrated example, four lead pins $LP_1$, $LP_2$, $LP_3$, and $LP_4$ are attached to the stem 40, and these $LP_1$, $LP_2$, $LP_3$, and $LP_4$ are connected to certain positions of the drive circuit pattern (not shown) formed on the sub-mount 12 by way of metal ribbons $R_1$, $R_2$, $R_3$, and $R_4$. Furthermore, the drive circuit pattern is connected to and the semiconductor laser element 13 by way of multiple metal thin wires W.

Multiple lead pins other than the lead pins $LP_1$, $LP_2$, $LP_3$, and $LP_4$ are attached to the stem 40, although they are not shown, and the drive circuit pattern (not shown) of the first temperature sensor 14, the first heater 15 (see FIG. 1), the drive circuit pattern (not shown) of the second temperature sensor 25, and the drive circuit patterns (not shown) of the second heaters 26a and 26b are connected to these lead pins.

In addition, a Peltier element 60 is fixed as a cooling device onto the back surface 40b of the stem 40, which is the main surface on the opposite side with respect to the main surface 40a to which the second block 10 is fixed. A third temperature sensor 65 is arranged in the vicinity of the Peltier element 60 to detect the temperature of the Peltier element 60. The lead pins attached to the stem 40, the Peltier element 60, and the third temperature sensor 65 are individually connected to certain external circuits (not shown). The laser light source module 50 operates under conditions that the Peltier element 60 cools the stem 40 and the heat sink 30, the first heater 15 heats the semiconductor laser element 13, and the second heaters 26a and 26b heat the wavelength conversion element 24, and thereby the laser beam LB (see FIG. 2) is emitted.

In the laser light source module 50 used in this manner, because, among the three blocks, i.e., the first block 1, the second block 10, and the third block 20, only the second block 10 is fixed to the stem 40, it is easier to adjust the relative position of the first block 1 with respect to the second block 10 and the relative position of the third block 20 with respect to the second block 10 than in a structure in which all the blocks 1, 10, and 20 are fixed directly to the stem 40. Furthermore, displacements of the relative positions of the blocks 1, 10, and 20 resulting from temperature change can be easily minimized. As a result, in the laser light source module 50, it is easy to achieve high positioning accuracy of the laser oscillating unit 3, the semiconductor laser element 13, and the wavelength conversion element 24 and high alignment accuracy of their optical axes.

Moreover, the second block 10 and the third block 20 includes the first heater 15 or the second heaters 26a and 26b, and the first to third blocks 1, 10, and 20 form the heat sink 30. Thus, without a cooling device arranged inside the module, the temperatures of the laser oscillating unit 3, the semiconductor laser element 13, and the wavelength conversion element 24 can be controlled with the first heater 15, the second heaters 26a and 26b, and the cooling device (Peltier element 60) arranged outside the module. Hence, the laser light source module 50 can be readily downsized.

Then, because all the components other than the first heater 15 are arranged on the top surfaces 1a, 10a, and 20a of the first to third blocks 1, 10, and 20, changeovers can be reduced during the production of the laser light source module 50, and wiring tasks between components and between blocks can be facilitated. Thus, the productivity of the laser light source module 50 can be easily improved.

From the aspect of increasing the optical output of the laser light source module 50, the laser light source module 50 should be operated with the temperatures of the semiconductor laser element 13 and the wavelength conversion element 24 held at the optimal operating temperatures. The optimal operating temperature of the semiconductor laser element 13 is roughly fixed in advance by the oscillation wavelength and output intensity of the semiconductor laser element 13 and therefore does not have much room for change. In contrast, because the wavelength converting units of the wavelength conversion element 24 (optical waveguides 24a; see FIG. 1) are formed of non-linear optical crystal having a periodically poled structure, the optimal operating temperature of the wavelength conversion element 24 can be relatively freely changed by suitably designing the periodically poled structure.

Thus, in the laser light source module 50, the optimal operating temperature of the wavelength conversion element 24 should be determined in consideration of the thermal resistance in the heat transfer path between the components of the laser light source module 50 and the cooling device such as the Peltier element 60, and the wavelength conversion element 24 should be used at the optimal operating temperature. The determination of the optimal operating temperature of the wavelength conversion element 24 is explained in detail below with reference to FIG. 4.

Figure 4:
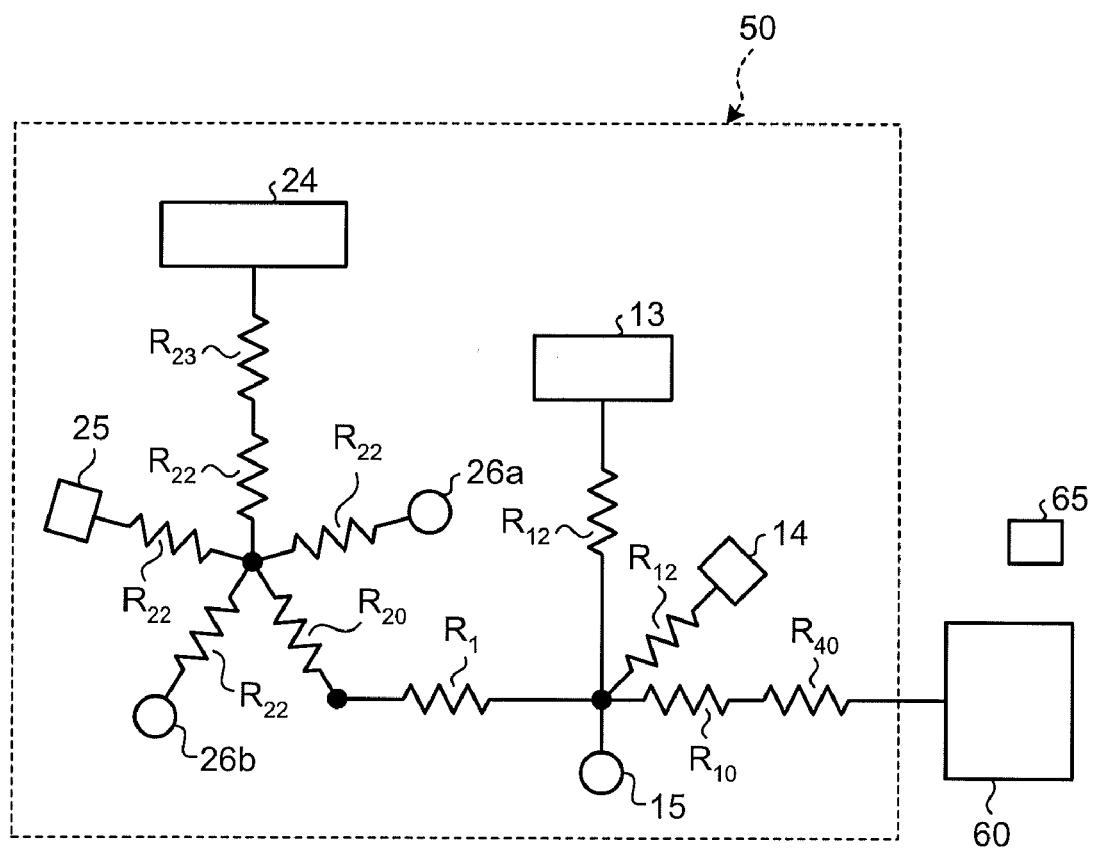
FIG. 4 is a schematic diagram of a heat transfer path between the components of the laser light source module illustrated in FIGS. 1 and 2 and the cooling device illustrated in FIG. 3.

FIG. 4 is a schematic diagram for showing the heat transfer path between the components of the laser light source module and the cooling device (Peltier element) illustrated in FIG. 3. The thermal resistance in the joint materials used in the laser light source module 50 is omitted from this drawing. For the structural components illustrated in FIG. 4 that are the same as the structural components of FIG. 3, the same reference numerals as those of FIG. 3 are employed, and the explanation thereof is omitted. The reference numeral "$R_1$" in FIG. 4 represents the thermal resistance of the first block 1, "$R_{10}$" represents the thermal resistance of the second block 10, "$R_n$" represents the thermal resistance of the third block 20, and "$R_{40}$" represents the thermal resistance of the stem 40. Moreover, the reference numeral "$R_{12}$" represents the thermal resistance of the sub-mount 12, "$R_{22}$" represents the thermal resistance of the substrate 22, and "$R_n$" represents the thermal resistance of the heat equalizing plate 23.

As can be seen in FIG. 4, when the thermal resistance in the joint materials that are used in the laser light source module 50 is ignored, a thermal resistance Ra in the heat transfer path from the semiconductor laser element 13 to the Peltier element 60 during the non-operating state of the first heater 15 can be expressed by the following equation (I). Here, when the heating value of the semiconductor laser element 13 is Pa, and the temperature of the Peltier element 60 is Tc, the temperature Ta of the semiconductor laser element 13 can be expressed by the following equation (II).

$$Ra [K/W] = R_{12} + R_{10} + R_{40} \quad (I)$$

$$Ta [°C.] = Tc + Ra \times Pa \quad (II)$$

On the other hand, when the thermal resistance in the joint materials used in the laser light source module 50 is ignored, a thermal resistance Rb in the heat transfer path from the wavelength conversion element 24 to the Peltier element 60 during the non-operating state of the first heater 15 and the second heaters 26a and 26b can be expressed by the following equation (III). Here, when the heating value of the wavelength conversion element 24 is Pb, and the temperature of the Peltier element 60 is Tc, the temperature Tb of the wavelength conversion element 24 can be expressed by the following equation (IV).

$$Rb [K/W] = R_{23} + R_{22} + R_{20} + R_1 + R_{10} + R_{40} \quad (III)$$

$$Tb [°C.] = Tc + Rb \times Pb \quad (IV)$$

Based on the expressions (II) and (IV), the temperature Tb of the wavelength conversion element 24 during the non-operating state of the first heater 15 and the second heaters 26a and 26b can be expressed by the following expression (V) regardless of the ambient temperature.

$$Tb [°C.] = Ta - Ra \times Pa + Rb \times Pb \quad (V)$$

Thus, the wavelength conversion element 24 can be readily maintained at the optimal operating temperature if the phase matching temperature, or in other words the optimal operating temperature, of the wavelength conversion element 24 is determined in the vicinity of "Tb" but lower than "Tb" that is obtained from the equation (V) when "Ta" in the expression (V) is brought to the semiconductor laser element 13 and the wavelength conversion element 24 kept at the optimal operating temperature is used in the laser light source module 50. How much the phase matching temperature of the wavelength conversion element 24 is differentiated from the temperature "Tb" is suitably determined with reference to the performance of the second heaters 26a and 26b incorporated in the laser light source module 50, the output intensity required for the laser light source module 50, the power consumption allowed for the laser light source module 50, and the like.

To control the temperatures of the semiconductor laser element 13 and the wavelength conversion element 24, the detection results obtained by the first temperature sensor 14 and the second temperature sensor 25, the detection results obtained by the third temperature sensor 65 (see FIG. 3) arranged in the vicinity of the Peltier element 60 to detect the temperature of the Peltier element 60, and the aforementioned thermal resistances are taken into consideration when determining the operating conditions of the first heater 15, the second heaters 26a and 26b, and the Peltier element 60. As long as the optimal operating temperature of the wavelength conversion element 24 is determined in the above manner, the semiconductor laser element 13 and the wavelength conversion element 24 can be easily maintained at the optimal operating temperatures, even with the second heaters 26a and 26b that produce small output, or even without a cooling device provided specially for the wavelength conversion element 24 in the vicinity thereof. The power consumption can be reduced when using the laser light source module 50.

Second Embodiment

In the laser light source module according to the present invention, the second heater that heats the wavelength conversion element may be arranged on the bottom surface of the third block on which the wavelength conversion element is arranged. The total number of second heaters can be any number larger than or equal to 1.

Figure 5:
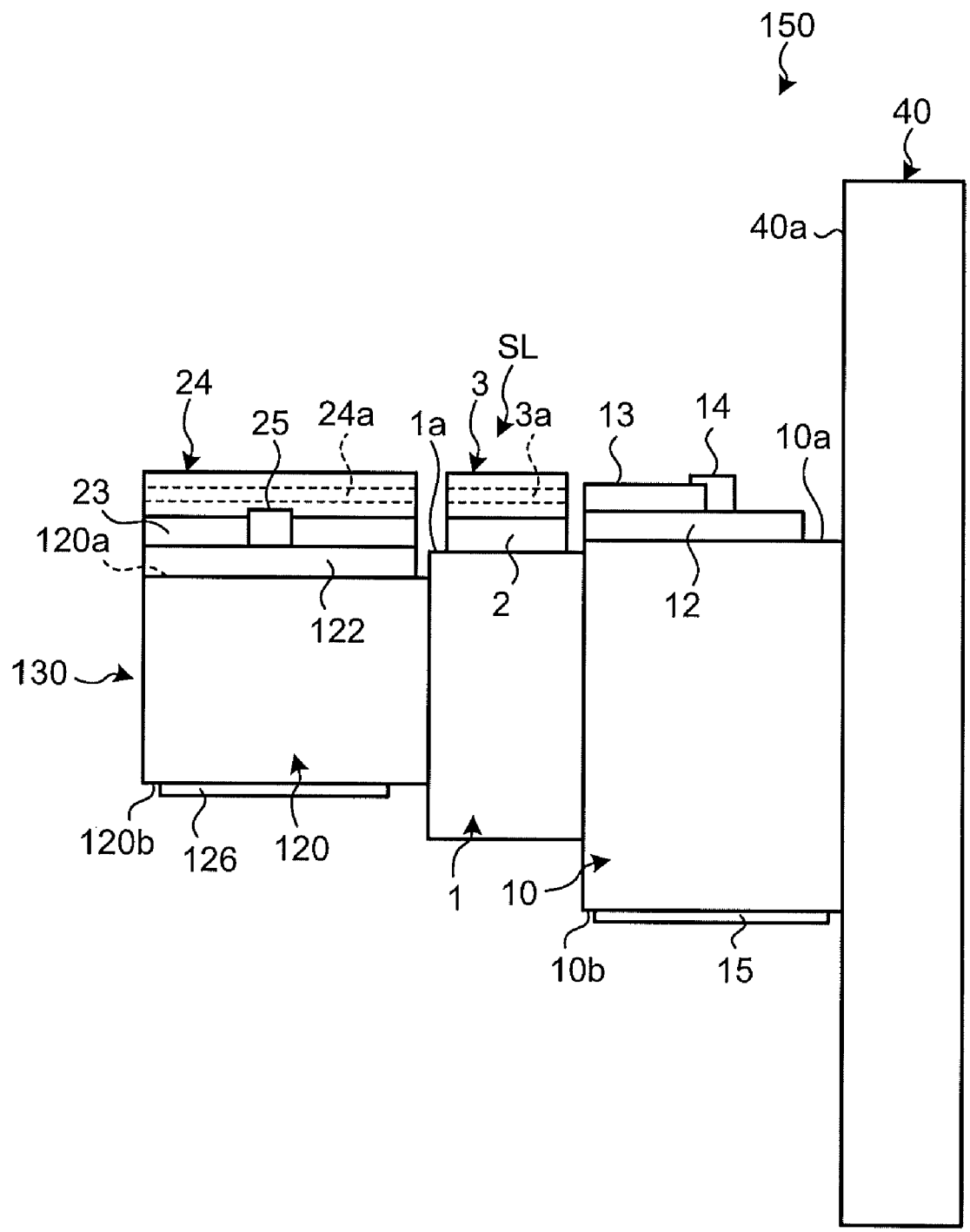
FIG. 5 is a schematic side view of an example of the laser light source module according to the present invention in which a second heater is arranged on the bottom surface of the third block.
Figure 6:
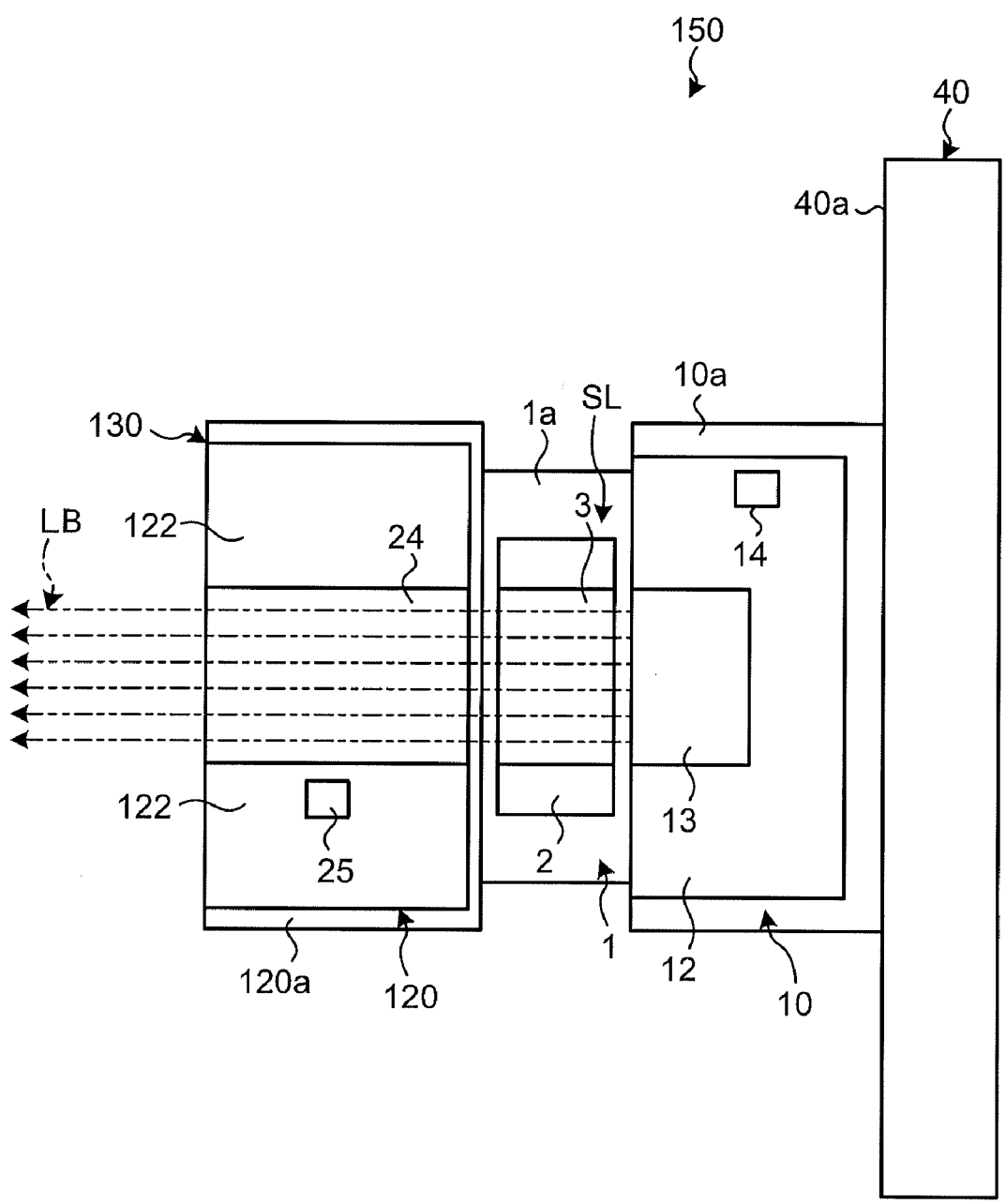
FIG. 6 is a schematic plan view of the laser light source module illustrated in FIG. 5.

FIG. 5 is a schematic side view of an example laser light source module with a second heater arranged on the bottom surface of the third block, and FIG. 6 is a schematic plan view of the laser light source module illustrated in FIG. 5. A laser light source module 150 illustrated in these drawings has the same structure as that of the laser light source module 50 illustrated in FIG. 1 or 2, except for a heat sink 130 that includes a third block 120 in place of the third block 20 illustrated in FIG. 1 or 2. The structural components of FIGS. 5 and 6 that are the same as those of FIGS. 1 and 2 are given the same reference numerals as in FIGS. 1 and 2, and the explanation thereof is omitted.

In the illustrated laser light source module 150, a single second heater 126 is arranged on the bottom surface 120b of the third block 120. No heater is arranged on the top surface 120a of the third block 120, and thus the third block 120 is downsized in comparison with the third block 20 illustrated in FIGS. 1 and 2. The same holds for a substrate 122 arranged on the top surface 120a of the third block 120. The wavelength conversion element 24 is heated by the second heater 126 by way of the third block 120, the substrate 122, and the heat equalizing plate 23.

The laser light source module 150 configured in this manner produces technical effects similar to the laser light source module 50 explained in the first embodiment. In addition, it can be further downsized than the laser light source module 50 explained in the first embodiment.

The laser light source module according to the present invention has been explained by referring to the embodiments, but, as set forth earlier, the present invention is not limited to these embodiments. For example, the first heater that heats the semiconductor laser element may be arranged on the top surface of the first block. When the first heater is arranged on the top surface of the first block, all the components on the first to third blocks can be placed from the same direction, which improves the assembling efficiency. However, because the area for placing the first heater has to be ensured on the top surface of the first block, the size of the laser light source module would be increased in comparison with the structure in which the first heater is arranged on the bottom surface of the first block.

The stem may be provided with a function of a heat sink, if necessary. A stem provided with the function of a heat sink can be obtained, for example, by forming a through hole in the stem to prepare a heat sink and pressing a metallic material or an alloy material having a high thermal conductivity such as a copper-based material into this through hole.

Moreover, the side surface on the second block side of the first block that forms the heat sink and the side surface on the first block side of the second block do not have to be orthogonal to the axis of the laser oscillating unit or the axis of the semiconductor laser element, but may be inclined at a certain angle with respect to the axis, if the top surface of the first block and the top surface of the second block can be easily brought onto the same plane or parallel to each other. Similarly, the side surface of the first block on the third block side and the side surface of the third block on the first block side do not have to be orthogonal to the optical axis of the laser oscillating unit or the optical axis of the wavelength conversion element but may be inclined at a certain angle with respect to the axis if the top surface of the first block and the top surface of the third block can be easily brought onto the same plane or parallel to each other.

The heat sink can be supported on the stem by fixing the bottom surface of the second block to the stem, the first block to the side surface of the second block, and the third block to the side surface of the first block. Various modifications, additions, and combinations other the ones mentioned above can be made in the laser light source module according to the present invention.

INDUSTRIAL APPLICABILITY

The laser light source module according to the present invention can be used as a light source module of a display device such as a laser TV and a printing device such as a laser printer.

The invention claimed is:

1. A laser light source module comprising a heat sink in which a solid laser element that oscillates a fundamental laser beam, an excitation light source that excites the solid laser element, and a wavelength conversion element that converts a wavelength of the fundamental laser beam oscillated by the solid laser element, and a stem that supports the heat sink, wherein:
the heat sink is separated into three blocks that are:
a first block on a top surface of which a laser oscillating unit for the solid laser element that oscillates the fundamental laser beam is arranged;
a second block on a top surface of which a semiconductor laser element that emits excitation light for the laser oscillating unit and a first temperature sensor are arranged, and on a specific surface of which a first heater is arranged; and
a third block on a top surface of which the wavelength conversion element that converts the wavelength of the fundamental laser beam oscillated by the laser oscillating unit and a second temperature sensor are arranged, and on a specific surface of which a second heater is arranged; and
only the second block is fixed at a side surface or a bottom surface thereof to the stem, the first block is fixed to the other side surface of the second block, and the third block is fixed to a side surface of the first block,
the wavelength conversion element is arranged on a substrate fixed onto the top surface of the third block with a thermal diffusion plate interposed therebetween; and
the second temperature sensor and the second heater are arranged on the substrate.

2. The laser light source module according to claim 1, wherein:
the semiconductor laser element is arranged on a sub-mount that is fixed to the top surface of the second block; and
the first temperature sensor is arranged on the sub-mount.

3. The laser light source module according to claim 1, wherein the first heater is arranged on the bottom surface of the second block.

4. The laser light source module according to claim 1, wherein the second heater is arranged on the bottom surface of the third block.

5. A laser light source module comprising a heat sink in which a solid laser element that oscillates a fundamental laser beam, an excitation light source that excites the solid laser element, and a wavelength conversion element that converts a wavelength of the fundamental laser beam oscillated by the solid laser element, and a stem that supports the heat sink, wherein:
the heat sink is separated into three blocks that are:
a first block on a top surface of which a laser oscillating unit for the solid laser element that oscillates the fundamental laser beam is arranged;
a second block on a top surface of which a semiconductor laser element that emits excitation light for the laser oscillating unit and a first temperature sensor are arranged, and on a specific surface of which a first heater is arranged; and
a third block on a top surface of which the wavelength conversion element that converts the wavelength of the fundamental laser beam oscillated by the laser oscillating unit and a second temperature sensor are arranged, and on a specific surface of which a second heater is arranged; and
only the second block is fixed at a side surface or a bottom surface thereof to the stem, the first block is fixed to the other side surface of the second block, and the third block is fixed to a side surface of the first block,
the wavelength conversion element is arranged on a substrate fixed onto the top surface of the third block with a thermal diffusion plate interposed therebetween; and
wherein the wavelength conversion element includes a wavelength converting unit that is formed of a non-linear optical material having a periodically poled structure and
when an optimal operating temperature of the semiconductor laser element is Ta, a heat value thereof is Pa, a heat value of the wavelength conversion element is Pb, a thermal resistance in a heat transfer path between the semiconductor laser element and a back surface of the stem is Ra, and a thermal resistance in a heat transfer path from the wavelength conversion element to the back surface of the stem is Rb, a phase matching temperature of the wavelength conversion element is set to a temperature in the vicinity of a temperature Tb and lower than the temperature Tb indicated by an equation (i):

$$Tb\ [°\ C.] = Ta - Ra \times Pa + Rb \times Pb \qquad (i).$$

* * * * *